United States Patent [19]

Kehr et al.

[11] 4,211,847
[45] Jul. 8, 1980

[54] POLYURETHANE FOAMS AND FOAM FORMING COMPOSITIONS CONTAINING AMINE SCAVENGERS

[75] Inventors: Clifton L. Kehr, Silver Spring; Louis L. Wood, Rockville; James L. Guthrie, Ashton, all of Md.

[73] Assignee: W. R. Grace & Co., New York, N.Y.

[21] Appl. No.: 962,542

[22] Filed: Nov. 20, 1978

Related U.S. Application Data

[63] Continuation-in-part of Ser. No. 831,628, Sep. 8, 1977, abandoned, which is a continuation-in-part of Ser. No. 728,464, Sep. 29, 1976, abandoned.

[51] Int. Cl.² ............... C08G 18/14; C08G 18/71
[52] U.S. Cl. ................ 521/121; 521/128; 521/160; 521/163; 521/905; 528/69
[58] Field of Search .......... 521/128, 905, 160, 121, 521/163; 528/69

[56] References Cited

U.S. PATENT DOCUMENTS

| | | | |
|---|---|---|---|
| 3,554,962 | 1/1971 | Fischer | 260/45.8 |
| 3,590,002 | 6/1971 | Powers | 252/182 |
| 3,706,710 | 12/1972 | Camilleri et al. | 528/83 |
| 3,790,508 | 2/1974 | Triolo | 260/2.5 AT |
| 3,839,491 | 10/1974 | Gamero et al. | 260/77.5 AT |
| 3,919,173 | 11/1975 | Coyner et al. | 260/77.5 AT |
| 3,923,713 | 12/1975 | Hermann | 528/69 |
| 3,925,319 | 12/1975 | Hiatt et al. | 260/75 NT |
| 3,959,191 | 5/1976 | Kehr et al. | 521/128 |
| 4,008,189 | 2/1977 | van Leuwen et al. | 260/2.5 AD |
| 4,130,542 | 12/1978 | Chang et al. | 528/67 |
| 4,137,200 | 1/1979 | Wood et al. | 521/905 |
| 4,160,076 | 7/1979 | Guthrie et al. | 521/905 |

FOREIGN PATENT DOCUMENTS

| | | |
|---|---|---|
| 2234507 | 2/1973 | Fed. Rep. of Germany . |
| 2000741 | 9/1969 | France . |
| 476 | 6/1968 | South Africa . |
| 1323955 | 7/1973 | United Kingdom . |

OTHER PUBLICATIONS

Wood–Hydrophilic Polyurethane Foam System–Jour., Cellular Plastics, Sep./Oct., 1976, pp. 285-288.

*Primary Examiner*—H. S. Cockeram
*Attorney, Agent, or Firm*—Richard P. Plunkett; William W. McDowell, Jr.

[57] ABSTRACT

This invention relates to urethane forming compositions and a method of forming polyurethanes having low residual potentially carcinogenic aromatic amines by adding scavengers from the group comprising cyclohexyl monoisothiocyanate and hindered aliphatic monoisocyanates of the general formula:

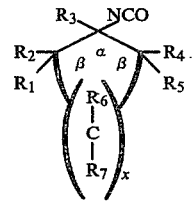

wherein $R_1$ - $R_7$ are H, alkyl, cycloalkyl, aryl, alkaryl, aralkyl or mixtures thereof and x is 1 to 7.

9 Claims, No Drawings

POLYURETHANE FOAMS AND FOAM FORMING COMPOSITIONS CONTAINING AMINE SCAVENGERS

CROSS-REFERENCE TO RELATED APPLICATIONS

This application is a continuation-in-part of copending application having Ser. No. 831,628, filed Sept. 8, 1977, now abandoned, which in turn is a continuation-in-part of Ser. No. 728,464, filed Sept. 29, 1976, now abandoned. The subject matter of said parent applications is hereby expressly incorporated by reference into the present application.

The present application is also related to Ser. No. 805,458, filed June 10, 1977, now U.S. Pat. No. 4,137,200, dealing with hydrophilic polyurethane foams prepared using large amounts of water.

BACKGROUND OF THE INVENTION

Recently it was discovered that polyurethane foams contain aromatic amines. Recent evidence has also tended to indicate that certain aromatic amines may represent a potential health hazard. Although the theory of formation of the aromatic amines is not clearly understood, it appears that aromatic isocyanates and possibly their reaction products containing urea and urethane linkages are hydrolyzed to produce free aromatic amines which can be leached from the polyurethane foam. On the other hand, hindered aliphatic isocyanates due to their low reaction rate do not compete successfully with the aromatic isocyanate for functional groups during the polymerization reaction. Therefore, the hindered aliphatic isocyanate scavenger survives polymerization and is thus capable of forming urea addition products with aromatic amines as these are produced.

Applicants are aware of certain prior art believed to be relevant. Specifically, British Pat. No. 1,368,625 describes preparation of polyurethane foams wherein from 1 to 20% by weight of an aliphatic polyisocyanate is employed in combination with conventional polyurethane foam reagents. The function of the aliphatic polyisocyanate appears to be to enhance formation of a dense integral skin during molding of the polyurethane foam. The aliphatic isocyanate is also said to contribute greatly to non-yellowing of the foam.

U.S. Pat. No. 3,790,508 describes light-stable polyurethane foams prepared by reacting a polyol, an aliphatic isocyanate, an aromatic isocyanate, a blowing agent and a catalyst. The aliphatic isocyanate index employed is from about 5 to about 40.

British Pat. No. 1,323,955 also describes formulations containing a mixture of aromatic and aliphatic isocyanates, water and a catalyst to cause trimerization of the aromatic isocyanate. The resulting foams are said to possess good physical properties as well as flame-resistance.

Applicants are further aware of the following patents:

| | |
|---|---|
| U.S. Pat. No. 3,839,491 | U.S. Pat. No. 3,554,962 |
| U.S. Pat. No. 3,925,319 | French 2,000,741 |
| U.S. Pat. No. 3,590,002 | German 22 34 507 |
| U.S. Pat. No. 3,919,173 | South African Pat. Publ. 68/00476 |
| U.S. Pat. No. 3,706,710 | |

DESCRIPTION OF THE INVENTION

The present invention arises from the discovery that polyurethane foams contain residual aromatic amines believed to result from hydrolysis of isocyanates during and subsequent to the foaming process and possibly due to hydrolysis of the foam during storage. For example, both one shot and prepolymer foams employing toluene diisocyanate have been found to contain the corresponding amine, e.g., toluene diamine (TDA). Foams employing other aromatic polyisocyanates will also contain the corresponding polyamine and thus, the invention is likewise applicable to these foams. To reduce the amount of aromatic amine, a "scavenger" is introduced prior to foaming, said scavenger being a material which can survive the foaming reaction to thereafter react with aromatic amines as they are generated.

It has been discovered that at least a stoichiometric amount, sufficient to react with any aromatic amines present, of an amine scavenger selected from the group consisting of cyclohexyl monoisothiocyanate and a hindered cycloaliphatic monoisocyanate of the general formula:

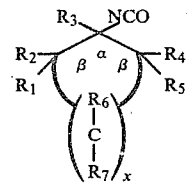

wherein $R_1-R_7$ are members of the group consisting of H, alkyl, cycloalkyl, aryl, alkaryl, aralkyl or mixtures thereof wherein the alkyl groups contain 1–18 carbon atoms, the cycloalkyl groups contain 4–8 carbon atoms and the aryl groups contain 5–14 carbon atoms with the proviso that where $R_3$ is a group member other than H, $R_1$, $R_2$, $R_4$ and $R_5$ can be H and with the further proviso that where $R_3$ is H at least two of $R_1$, $R_2$, $R_4$ and $R_5$ are group members other than H and x is 1 to 7 when added to a urethane prepolymer or the components of a one shot foam system results in polyurethane foams having a low residue of aromatic amines.

Herein the above group members will be referred to as aromatic amine scavengers.

The amount of aromatic amine scavengers added to the system is in the range 0.01 to 15 parts by weight based on the weight of the total reactants used to form the polyurethane other than water. The lower limit on the amount of aromatic amine scavengers present is not critical but is determined by the degree of scavenging activity desired.

Exemplary aromatic amine scavengers include cyclohexylisothiocyanate and hindered aliphatic monoisocyanates within the confines of the formula including, but not limited to, 1-methylcyclohexylisocyanate; 1,2,6-trimethylcyclohexylisocyanate; 2,2,6-trimethylcyclohexylisocyanate; 1,2-dimethylcyclohexylisocyanate; 2,6-dimethylcyclohexylisocyanate; 2,6-diethylcyclohexylisocyanate; 2,2,6,6-tetramethylcyclohexylisocyanate; 1,2,2,6,6-pentamethylcyclohexylisocyanate; 2,3,6-triphenylcyclohexylisocyanate, 6-methyl-2-benzylcyclohexylisocyanate, 2,4,6-trimethylcyclohexylisocyanate, 2,6-dipropylcyclohexylisocyanate, 6-methyl-2-ethylcyclohexylisocyanate, 2,5-dimethylcyclopentylisocyanate and the like. Mixtures of the isocyanates may also be used.

As used herein, the term "aromatic amines" relates to amines formed from any of various well known aromatic isocyanates used to form polyurethanes, however, for purposes of brevity the invention will be explained and exemplified using toluene diisocyanate as the precursor for toluene diamine since this material is the most widely used commercially. Obviously, other well known and commercially available aromatic isocyanates form aromatic amines when used to form polyurethanes including, but not limited to, PAPI (a polyaryl polymethylenepolyisocyanate as defined in U.S. Pat. No. 2,683,730), triphenylmethane-4,4',4"-triisocyanate, benzene-1,3,5-triisocyanate, toluene-2,4,6-triisocyanate, diphenyl-2,4,4'-triisocyanate, xylene diisocyanate, m-phenylene diisocyanate, cumene-2,4-diisocyanate, chlorophenylene diisocyanate, diphenylmethane-4,4'-diisocyanate, naphthalene-1,5-diisocyanate, xylene-alpha, 3,3'-dimethyl-4,4'-biphenylene diisocyanate, 3,3'-dimethoxy-4,4'-biphenylene diisocyanate, 2,2',5,5'-tetramethyl-4,4'-biphenylene diisocyanate, 4,4'-methylene-bis(phenylisocyanate), 4,4'-sulfonylbis (phenylisocyanate), 4,4'-methylene di-orthotolylisocyanate, 2,4-diisocyanatodiphenylether and the like. Mixtures of any one or more of the above mentioned aromatic isocyanates may be used to form polyurethane foams as desired. The low residue foams produced according to the present invention can be rigid, semi-rigid or flexible.

It should be quite apparent to one skilled in the art that not all isocyanates are operable as scavengers in the instant invention. That is, when one adds, e.g., an aliphatic isocyanate as a scavenger, to a prepolymer or reactants to form a polyurethane, obviously the water reactant will, if possible, react with the aliphatic isocyanate as well as the aromatic isocyanate, e.g., toluene diisocyanate, to form the polyurethane. Thus, it is critical in the instant invention that, when the aromatic amine scavenger is an aliphatic isocyanate, it must have a considerably slower reaction rate with water than the aromatic isocyanate. That is, the aromatic isocyanate must react substantially completely with water to form the polyurethane before the aliphatic isocyanate can contemplate a competing reaction. Thus, aliphatic isocyanates having substantially the same reaction rate as aromatic isocyanates with a polyol or water would not be available to scavenge the later formed aromatic amines. To properly act as an aromatic amine scavenger, the scavenger herein should exhibit a reaction rate with water which is less than $10^{-2}$ times the reaction rate of the aromatic isocyanate with water and preferably $10^{-3} - 10^{-7}$.

To insure that the scavenger has a slower reaction rate with water than aromatic isocyanates, the aliphatic monoisocyanates used herein are sterically hindered in all instances except in the case of the cycloaliphatic isothiocyanates.

In carrying out the reaction rate test, separate aqueous solutions or dispersions of the aromatic isocyanate and scavenger can be prepared at a concentration of about $10^{-2}$ moles/liter. The rate of reaction can be measured at about 25° C. In the event either the scavenger or aromatic isocyanate is insoluble in water, the test can be carried out using constant agitation and suitable surfactants or a suitable water-miscible cosolvent can be employed.

From the preceding description it can be seen that the scavenger should react more slowly with water than does the aromatic isocyanate. The proper scavenger to be employed with a particular aromatic isocyanate can be determined by dissolving the corresponding amine (e.g., TDA in the case of toluene diisocyanate) and the scavenger at equivalent (or greater) stoichiometric levels, i.e., enough of the scavenger is employed to react with one hydrogen atom in each $NH_2$ group, in a common inert solvent. Within 16 hours at ambient temperatures the scavenger and amine should undergo a reaction which is essentially irreversible and runs to completion in the 16 hour period.

Other factors which are important to reducing the level of aromatic amines and optimizing the effect of the aromatic amine scavengers include the following. Polyurethane foams which are stored while still wet tend to exhibit a higher level of aromatic amines than corresponding foams stored following dryings. Thus, higher percentages of aromatic amine scavengers have to be added to these materials to obtain allowable residues of aromatic amines. Additionally, the use of certain catalyst in the foaming reaction have been found to be detrimental, i.e., it is preferred that any catalyst employed be a "mild" catalyst which promotes reaction between the aromatic isocyanate and hydroxyl groups of the polyol and permits the foaming reaction to proceed at a reasonable rate but does not cause undesirable side reactions consuming the aromatic amine scavenger. If conventional strong catalyst (e.g., tin salts) are employed, the amount thereof should be reduced.

The aromatic amine scavenger system disclosed herein is operable with all presently known polyurethane foaming systems including the one shot method and hydrophobic prepolymer method. Additionally, it is operable in the more recently known method for forming hydrophilic polyurethane foam from hydrophilic prepolymers as will be more fully discussed hereinafter.

The methods of forming polyurethanes supra are conventional, well known in the art and form no part of this invention. The one shot (see, for example, U.S. Pat. No. 3,790,508 and British Pat. No. 1,368,625) and hydrophobic prepolymer (including semiprepolymer) methods are well documented, e.g., see Kirk-Othmer, Encyclopedia of Chemical Technology, 2nd Ed., Vol. 12, pp. 45–50, and Vol. 9, pp. 853–855. The method of forming polyurethane foams from hydrophilic prepolymers is taught in U.S. Ser. No. 805,458, filed June 10, 1977, now U.S. Pat. No. 4,137,200. Briefly stated, in the one-shot process all the necessary ingredients for producing the foam are mixed together and then discharged from the mixer onto a suitable surface. The reactions bein immediately and proceed at such a rate that expansion starts in about 10 sec; the entire expansion is completed in 1 or 2 min. The completion of the curing may take several days.

In the hydrophobic prepolymer process the polyhydroxy component is reacted with enough polyisocyanate to result in formation of a prepolymer with isocyanate end groups plus excess isocyanate (where R is typically a polyether structure containing less than 40 mole % oxyethylene units but can also be a polyester):

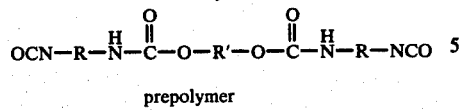

prepolymer

The prepolymer mixture is then reacted with water to simultaneously release carbon dioxide for expansion and link the chains together into a crosslinked matrix. This method is most often used for flexible foams.

In a "semiprepolymer process" which has become more extensively used for forming rigid foams, a prepolymer containing excess isocyanate is mixed with more polyhydroxy resin and a separate blowing agent such as a halocarbon. In this case the prepolymer may contain only a few percent of the total polyhydroxy resin. A more detailed explanation of these conventional methods follows.

PREPOLYMER FOAM SYSTEMS

A preferred embodiment of the invention is the prepolymer method for preparing polyurethane foams, said method comprising foaming (under conventional conditions) a mixture comprising: (a) an aromatic amine scavenger and (b) a urethane prepolymer having polyether or polyester backbone segments capped with an aromatic isocyanate and wherein said aromatic amine scavenger is present in an amount less than or equal to about 15 parts by weight of said prepolymer. Preferably, the amount of scavenger is less than or equal to about 10 parts by weight of said prepolymer. The lower limit on the amount of scavenger present is not critical but is determined by the degree of scavenging activity desired and also by the nature of the scavenger. Generally, a level of not less than 0.01 parts should be employed.

In preparing foams by the prepolymer technique, the prepolymer is generally admixed with a suitable blowing agent (e.g., water), a catalyst (optional) and other additives (e.g., fire retardants) depending on the ulti-technique are included in U.S. Pat. No. 3,748,288 and in Saunders and Frisch, Polyurethanes Chemistry and Technology, Interscience Publishers, New York, 1964. The amount of water employed a a blowing agent can amount of water employed as a blowing agent can range from about 0.4 moles of H$_2$O/mole of NCO groups to about 1,000 moles of H$_2$O/mole of NCO groups.

In determining the amount of water added to form the polyurethane in any method disclosed herein, the "mole of NCO groups" refers to the NCO groups in the aromatic isocyanate remaining after reaction of the theoretical amount of the NCO groups in the aromatic isocyanate necessary to react with all the hydroxyl groups of the polyol have been used up.

The urethane prepolymer employed consists generally of polyether or polyester backbone segments capped with an aromatic isocyanate (e.g., TDI). Suitable aromatic isocyanates are set forth supra. Suitable polyether prepolymers include, for example, the polyalkylene oxide ethers, such as the reaction products of ethylene oxide, propylene oxide, butylene oxide, styrene oxide, picoline oxide or methyl glycoside, with a compound containing two or more reactive hydrogens, such as water, resorcinol, glycerol, trimethylol propane, pentaerythritol, ethylene glycol, diethylene glycol, triethylene glycol and the like. The polyethers are further exemplified by compounds such as polyoxypropylene glycol, polyoxyethylene glycol, polyoxybutylene glycol, polyoxyethyleneoxypropylene glycol, polyoxyethyleneoxybutylene glycol and polyoxypropyleneoxybutylene glycol. To obtain hydrophilic urethane foams by the prepolymer method, the polyether urethane prepolymers employed are hydrophilic, i.e., at least 40 mole % of the oxyalkylene units in the prepolymer backbone are oxyethylene units with the balance being oxypropylene, oxybutylene or other oxyalkylene units. In the resulting polyurethane foams the branch-points of the polymer chains are connected by essentially linear polyoxyalkylene chains containing at least 40 mole % of oxyethylene units (excluding initiators at branch points) as described above. Preferably, the oxyethylene content is from about 60 to 75 mole %. At oxyethylene levels of 40–60 mole %, it may be desirable to use a surfactant known in the art to promote dispersion of the prepolymer in water prior to foaming. The foams resulting from polyether urethane prepolymers wherein at least 40 mole % of the oxyalkylene units in the prepolymer backbone are oxyethylene are hydrophilic.

Suitable hydrophilic prepolymers are prepared by capping a polyoxyalkylene polyol (i.e., polyether) with an excess of polyisocyanate, e.g., toluene diisocyanate. Prior to capping, the polyol should have a molecular weight of from about 200 to about 20,000 and preferably from about 600 to 6,000. The hydroxy functionality of the polyol and the corresponding isocyanate functionality following capping is from 2 to about 8. If foams are formed from prepolymers with an isocyanate functionality of about 2, the resulting foam is essentially linear and does not have as much tensile strength as crosslinked foams. Accordingly, if the isocyanate functionality is about 2, a crosslinker can be employed although the linear non-crosslinked foams are operable in the present invention. To minimize adverse reactions involving the scavenger, any crosslinkers employed should preferably be aliphatic polyols (e.g., TMOP, glycerol or pentaerythritol) rather than amines.

Examples of suitable polyols (to be capped with polyisocyanates) include: (A) essentially linear polyols formed, for example, by reaction of ethylene oxide with water, ethylene glycol or higher molecular weight glycols as an initiator. As discussed above, mixtures of ethylene oxide with other alkylene oxides can be employed to form hydrophilic prepolymers so long as the mole percent of ethylene is at least 40 percent. Also, as stated, it may be desirable to use crosslinkers with these systems in which case the crosslinker can be included in the water into which the prepolymer is dispersed. Where the linear polyethers are mixtures of ethylene oxide with. e.g., propylene oxide, the polymer can be either random or a block copolymer and the terminal units can be either oxyethylene or oxypropylene. A second class of polyol (B) includes those with a hydroxy functionality of 3 or more. Such polyols are commonly formed by reacting alkylene oxides with a polyfunctional initiator such as trimethylolpropane, pentaerythritol, etc. In forming the Polyol B, the alkylene oxide used can be ethylene oxide or mixtures of ethylene oxide with other alkylene oxides as described above. Useful polyols can be further exemplified by (C) a mixture of linear and branched polyfunctional polyols as exemplified in A and B above together with an initiator or crosslinker. A specific example of C is a mixture of polyethylene glycol (m. w. about 1,000) with trimethylolpropane, trimethylolethane or glycerine. This mixture can be subsequently reacted with excess polyisocyanate to provide a prepolymer useful in the invention. Alternatively, the linear polyols (e.g., polyethylene glycol) can be reacted separately with excess polyisocyanate. The initiator, e.g., trimethylolpropane, can also be separately reacted with polyisocyanate. Subsequently, the two capped materials can be combined to form the prepolymer.

Thus, by using a hydrophilic prepolymer as taught in U.S. Ser. No. 805,458, a crosslinked hydrophilic foam having a three-dimensional network is formed from the reaction product of A. isocyanate capped prepolymers consisting of a mixture of (1) an isocyanate capped hydrophilic polyoxyethylene diol, said diol having an ethylene oxide content of at least 40 mole percent; and (2) an isocyanate capped polyol having a hydroxyl functionality in the range 3 to 8 prior to capping; said isocyanate capped polyol being present in an amount in the range 2.9 to 50% by weight of (1) and (2); B. 0.5 to 10.0% by weight of A and B of a polyisocyanate having an isocyanate functionality in the range 2.0 to 3.0; and C. 6.5 to 390 moles of water for each mole of unreacted isocyanate.

The process of forming said crosslinked hydrophilic urethane foam comprises admixing a hydrophilic polyoxyethylene diol having an ethylene oxide content of at least 40 mole percent with a polyol having a hydroxyl functionality in the range 3 to 8, said polyol being present in the admixture in an amount in the range 1.0 to 20% by weight, reacting with the admixture at a temperature in the range 0° to 120° C. an amount of a polyisocyanate having an isocyanate functionality in the range 2.0 to 3.0 equal to 1.8 to 1.9 NCO to OH equivalents for a time sufficient to cap substantially all the hydroxyl groups of the admixture, adding additional polyisocyanate having an isocyanate functionality in the range 2.0 to 3.0 to provide 0.1 to 0.3 equivalents of NCO per initial equivalent of OH in excess of the theoretical amount necessary to react with the hydroxyl groups and thereafter adding 6.9 to 390 moles of water for each mole of unreacted isocyanate in the admixture.

Useful hydrophobic prepolymers are based on polyether polyols containing less than 40 mole percent polyoxyethylene units and polyester polyols. The polyester polyols are based on the reaction product of polyfunctional organic carboxylic acids and polyhydric alcohols. Typical polyfunctional organic carboxylic acids which may be employed in producing polyesters useful in carrying out the present invention include, for example, dicarboxylic aliphatic acids such as succinic, adipic, sebacic, azelaic, glutaric, pimelic acids and dicarboxylic aromatic acids such as phthalic acid, terephthalic acid, isophthalic acid and the like. Other polycarboxylic acids that can be employed include the "dimer acids" such as the dimer of linoleic acid. Hydroxyl-containing monocarboxylic acids such as ricinoleic acid may also be employed. Alternatively, the anhydrides of any of these acids can be employed in producing the polyesters. Typical polyhydric alcohols that may be employed in producing polyesters useful in carrying out the present invention include, for example, the monomeric polyhydric alcohols such as glycerol, 1,2,6-hexane triol, ethylene glycol, trimethylol propane, trimethylol ethane, pentaerythritol, propylene glycol, 1,3-butylene glycol and 1,4-butylene glycol.

ONE-SHOT URETHANE FOAM MIXTURES

A second preferred embodiment of the invention is a method for preparing polyurethane foams by the one-shot process. The method involves foaming (using conventional techniques) a mixture comprising: (a) aromatic amine scavenger, (b) aromatic isocyanate, (c) a polymeric polyol and (d) a catalyst system for promoting reaction between the aromatic isocyanate and the hydroxyl groups of the polyol. The aromatic isocyanate index is from about 110 to about 96.

The expression "index" is an art recognized term indicating the ratio of the actual amount of aromatic isocyanate in the reaction mixture to the theoretical amount of isocyanate needed for reaction with all active hydrogen compounds present in the reaction mixture multiplied by 100.

This one-shot technique is currently the most commonly used method in polyurethane foam formation. U.S. patents describing this technique include U.S. Pat. Nos. 3,801,687, 3,748,288, 3,709,843 and 3,681,273 as well as Saunders and Frisch, Polyurethanes Chemistry and Technology Interscience Publishers Inc., New York, 1964.

Conventional catalyst systems can be employed in preparing the one-shot foams of the invention. The method of using the catalysts is also conventional. However, it has been found that many catalysts increase the amount of aromatic amines in the foams and accordingly the amount of catalyst employed should be held to a minimum consistent with obtaining a desirable rate in the foaming reaction as well as desirable properties in the finished foam. As discussed above, suitable catalysts should promote reaction between the polyol and the NCO groups of the aromatic isocyanate and should be employed under conditions where detrimental side reactions (e.g., trimerization, dimerization and biuret formation) are minimized. A listing of conventional catalysts for promoting the NCO/alcohol reaction is set forth at TABLE LXX (page 212) of Saunders and Frisch, Polyurethanes Chemistry and Technology (Part I), 1962 by John Wiley & Sons.

A brief table illustrating conventional catalysts and suitable amounts thereof (in parts of catalyst/100 parts by weight of the polyol) is set forth below. According to conventional practice, catalysts are many times used in conjunction with each other and thus, the actual amounts employed may vary considerably. Whether employed singly or in combination, the total amount of catalyst should be as little as possible, consistent with obtaining desired results.

| CATALYSTS | | | |
|---|---|---|---|
| Tertiary Amines | Tin Salts | Fe Salts | Miscellaneous Catalysts |
| N-ethylmorpholine (0.2–1.0) | Stannous octoate (0.01–0.5) | Ferric 2-ethylhexanoate (0.05–1.0) | Cobaltnaphtenate (0.01–1.0) |
| Diethylenetriamine (0.2–1.5) | Dibutyltindiacetate (0.01–0.5) | Ferric chloride (0.03–1.0) | Tetrabutyl titanate (0.01–1.2) |
| Triethylenediamine (0.05–1.5) | Dibutyltindilaurate (0.01–0.5) | Ferric acetylacetonate (0.03–1.5) | Lead oleate (0.01–1.0) |

-continued

CATALYSTS

| Tertiary Amines | Tin Salts | Fe Salts | Miscellaneous Catalysts |
|---|---|---|---|
| Triethylamine (0.3–1.5) | Dibutyltindioctoate (0.01–0.5) | | |
| N,N-dimethyl,-N'N'-dimethyl-1,3-diaminobutane (0.2–1.0) | | | |

In the one-shot method of preparing foams all of the ingredients, e.g., the polyether or polyester polyol, the aromatic isocyanate, the aromatic amine scavenger, the blowing agent, catalyst and any additional components such as UV absorber, surfactant, fire retardant additive, fillers, etc., are vigorously mixed together and poured onto a surface or into a mold where foaming takes place. The general technology of preparing one-shot foams (with the exception of the aromatic amine scavenger used to reduce residual aromatic amines) does not form part of the present invention and is well known to those skilled in the art. See, for example, U.S. Pat. No. 3,790,508 and British Pat. No. 1,368,625 both of which are hereby incorporated by reference to the extent said patents teach foam formation via conventional one-shot techniques.

In both the one shot and the hydrophobic prepolymer process for forming polyurethane foams the amount of water employed is substantially stoichiometric to react with the NCO groups remaining after theoretically all of the OH groups on the polyol have been reacted with isocyanate. Thus, the amount of water employed can range from about 0.4 to 0.6 moles of $H_2O$ per mole of NCO groups remaining after the polyisocyanate reacts with all of the OH groups in the polyol.

A method of forming hydrophilic polyurethane foams from hydrophilic isocyanate capped prepolymers discussed herein is taught in U.S. Ser. No. 805,458, filed June 10, 1977, now U.S. Pat. No. 4,137,200, incorporated by reference herein to the extent said patent teaches hydrophilic foam formation using hydrophilic prepolymers with massive amounts of water. In this method massive amounts of water, i.e., 0.6 to 1,000, preferably 6.5 to 390 moles $H_2O$/mole of NCO groups in the polyisocyanate (exclusive of NCO groups required for reaction with the polyol) are employed.

The aromatic amine scavenger system disclosed herein is operable with all presently known conventional polyurethane foaming systems including the one-shot method and the hydrophobic and hydrophilic prepolymer method.

In practicing the instant invention, the addition of the aromatic amine scavenger is carried out as follows. In the one shot method of forming polyurethane foams, the aromatic amine scavenger is added and admixed simultaneously with all the other reactants. In the prepolymer method, be it hydrophobic or hydrophilic prepolymer, the aromatic amine scavenger is preferably added to the prepolymer, and then water is added to the prepolymer admixture. It is also possible to add the scavenger to the water and then add this admixture to the prepolymer, but in this later case a greater possibility of a water-scavenger reaction exists. This is to be avoided, if possible, in order to obtain optimum results from the scanvenger.

The following examples are set out to explain, but expressly not limit, the instant invention. Unless otherwise noted, all parts and percentages are by weight.

EXAMPLE 1

50 g of known 2,6-diethylcyclohexylamine was dissolved in 230 g of chlorobenzene in an addition funnel. In a separate multiple neck, round bottom flask equipped with stirrer, phosgene and nitrogen inlets and outlets, reflux condenser and thermometer, 200 g of $COCl_2$ was condensed in 230 g of chlorobenzene while maintaining the flask at about $-5°$ C. in a bath of acetone cooled with dry ice. The aforesaid amine solution was added dropwise to the flask over a 10 minute period with stirring at 600 rpm while maintaining the reaction temperature in the range $-5°$ to $-3°$ C. After addition, stirring was continued at 300 rpm while the flask contents were allowed to warm to $130°$–$135°$ C. and excess phosgene was distilled. The reaction was continued for 1¾ hrs. with stirring while additional $COCl_2$ was passed through the reaction mixture. Nitrogen was then sparged through the flask to flush out excess phosgene and hydrogen chloride. The product was freed of chlorobenzene solvent by stripping on a Roto-Vap at $73°$ C. The residue was distilled under vacuum (0.1 mm Hg) and the fraction boiling between $58°$–$61°$ C. was collected. The yield was 45.6 g (78% theoretical). IR showed a strong NCO absorption. NMR revealed the product to be free of contaminants and to have the desired structure, i.e.,

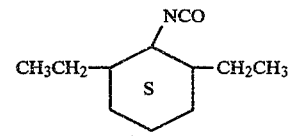

Elemental analysis found C=70.97, H=10.30, O=9.33, N=7.95 whereas theoretical is C=72.93, H=10.50, O=8.84 and N=7.73.

EXAMPLE 2

A hydrophilic, isocyanate capped urethane-containing prepolymer was prepared by admixing 2 molar equivalents of polyethylene glycol having an average molecular weight of 1,000 (PEG-1,000) and one molar equivalent of trimethylolpropane (TMOP). The admixture was dried at $100°$–$110°$ C. under a pressure of 5–15 Torr to remove water. The resulting dried mixture was slowly added over a period of about one hour to a vessel containing 6.65 molar equivalents of toluene diisocyanate (TDI) while stirring the TDI and polyol mixture. The temperature was maintained at $60°$ C. The mixture was maintained at $60°$ C. with stirring for three additional hours. Then an additional 1.05 molar equivalent of TDI was added with stirring over a period of about one hour while maintaining the temperature at $60°$ C. The final reaction mixture contained a 10% molar excess of TDI. All hydroxyl groups were capped with isocyanate and some chain extension occurred between the polyols and the TDI. The prepolymer contained 5.6% by weight of free TDI.

The following examples show the best mode of using a hindered aliphatic monoisocyanate and a cycloaliphatic isothiocyanate as amine scavengers in a polyurethane foam:

EXAMPLE 3

100 g of the prepolymer reaction mixture from Example 2 supra were admixed in a beaker with 4 g of 2,6-diethylcyclohexyl isocyanate from Example 1. In a separate beaker 2 g of a non-ionic polyether based surfactant sold under the tradename "Pluronic L-62" by BASF-Wyandotte and 100 g of water were admixed. The two admixtures were combined in a Waring blender and admixed with agitation. The resultant foam after oven drying for ½ hour at 65° C. was analyzed for toluene diamine in accord with the method described in the article by J. L. Guthrie and R. W. McKinney, published in the September, 1977 issue of Analytical Chemistry, pp. 1676–1680. The toluene diamine content was less than 1.0 ppm. In a control run, wherein no 2,6-diethylcyclohexyl isocyanate was added to the system, the foam contained 14.3 ppm of toluene diamine.

EXAMPLE 4

Example 3 was repeated except that 2 g of cyclohexyl isothiocyanate was substituted for the 4 g of 2,6-diethylcyclohexyl isocyanate as the aromatic amine scavenger. The toluene diamine content of the foam was 16.3 ppm as composed to the control without the amine scavenger which contained 54.7 ppm.

We claim:

1. A mixture for preparing polyurethane foams having a reduced aromatic amine content comprising an admixture of
   (a) a member of the group consisting of
      1. a urethane-containing prepolymer having polyether or polyester backbone segments end-capped with an aromatic isocyanate and
      2. an aromatic polyisocyanate and a polyol selected from the group consisting of polyethers and polyesters;
   (b) 0.01 to 15% by weight of said group member (a) of an aromatic amine scavenger selected from the group consisting of cyclohexyl monoisothiocyanate and a hindered cycloaliphatic monoisocyanate of the general formula:

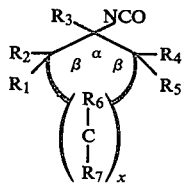

wherein $R_1$–$R_7$ are members of the group consisting of H, alkyl, cycloalkyl, aryl, alkaryl, aralkyl or mixtures thereof wherein the alkyl groups contain 1–18 carbon atoms, the cycloalkyl groups contain 4–8 carbon atoms and the aryl groups contain 6–14 carbon atoms with the proviso that where $R_3$ is a group member other than H, $R_1$, $R_2$, $R_4$ and $R_5$ can be H and with the further proviso that where $R_3$ is H at least two of $R_1$, $R_2$, $R_4$ and $R_5$ are group members other than H and x is 1 to 7; and
   (c) about 0.4 to 1,000 moles of water for each mole of NCO.

2. The mixture according to claim 1 wherein the aromatic amine scavenger is 2,6-diethylcyclohexyl isocyanate.

3. The mixture according to claim 1 wherein the aromatic amine scavenger is cyclohexyl isothiocyanate.

4. A mixture for preparing polyurethane foams having a reduced aromatic amine content comprising
   A. a member of the group consisting of:
      1. the reaction product of aromatic isocyanate capped prepolymers consisting of a mixture of
         (a) an aromatic isocyanate capped hydrophilic polyoxyethylene diol, said diol having an ethylene oxide content of at least 40 mole percent;
         (b) an aromatic isocyanate capped polyol having a hydroxyl functionality in the range 3 to 8 prior to capping; said isocyanate capped polyol being present in an amount in the range 2.9 to 50% by weight of (a) and (b); and
         (c) 0.5 to 10.0% by weight of (a) and (b) of an aromatic polyisocyanate having an isocyanate functionality in the range 2.0 to 3.0; and
      2. an aromatic polyisocyanate and a polyol selected from the group consisting of polyethers and polyesters;
   B. 0.01 to 15% by weight of said group member A. of an aromatic amine scavenger selected from the group consisting of cyclohexyl monoisothiocyanate and a hindered cycloaliphatic monoisocyanate of the general formula:

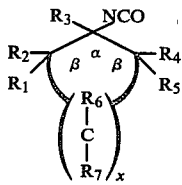

wherein $R_1$–$R_7$ are members of the group consisting of H, alkyl, cycloalkyl, aryl, alkaryl, aralkyl or mixtures thereof wherein the alkyl groups contain 1–8 carbon atoms, the cycloalkyl groups contain 4–8 carbon atoms and the aryl groups contains 6–14 carbon atoms with the proviso that where $R_3$ is a group member other than H, $R_1$, $R_2$, $R_4$ and $R_5$ can be H and with the further proviso that where $R_3$ is H at least two of $R_1$, $R_2$, $R_4$ and $R_5$ are group members other than H and x is 1 to 7; and
   C. about 0.4 to 1,000 moles of water for each mole of NCO.

5. The mixture according to claim 4 wherein the aromatic amine scavenger is 2,6-diethylcyclohexyl isocyanate.

6. The mixture according to claim 4 wherein the aromatic amine scavenger is cyclohexyl isothiocyanate.

7. A crosslinked hydrophilic foam having a three-dimensional network comprising the reaction product of
   A. isocyanate capped prepolymers consisting of a mixture of
      (1) an isocyanate capped hydrophilic polyoxyethylene diol, said diol having an ethylene oxide content of at least 40 mole percent; and
      (2) an isocyanate capped polyol having a hydroxyl functionality in the range 3 to 8 prior to capping; said isocyanate capped polyol being present in an amount in the range 2.9 to 50% by weight of (1) and (2);

B. 0.5 to 10% by weight of A and B of an aromatic polyisocyanate having an isocyanate functionality in the range 2.0 to 3.0;

C. 0.01 to 15% by weight of A and B of an aromatic amine scavenger selected from the group consisting of cyclohexyl monoisothiocyanate and a hindered cycloaliphatic monoisocyanate of the general formula:

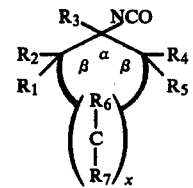

wherein $R_1$–$R_7$ are members of the group consisting of H, alkyl, cycloalkyl, aryl, alkaryl, aralkyl or mixtures thereof wherein the alkyl groups contain 1–18 carbon atoms, the cycloalkyl groups contain 4–8 carbon atoms and the aryl groups contain 6–14 carbon atoms with the proviso that where $R_3$ is a group member other than H, $R_1$, $R_2$, $R_4$ and $R_5$ can be H and with the further proviso that where $R_3$ is H at least two of $R_1$, $R_2$, $R_4$ and $R_5$ are group members other than H and x is 1 to 7; and D. 6.5 to 390 moles of water for each mole of unreacted isocyanate.

8. The hydrophilic foam according to claim 7 wherein the aromatic amine scavenger is 2,6-diethylcyclohexyl isocyanate.

9. The hydrophilic foam according to claim 7 wherein the aromatic amine scavenger is cyclohexyl isothiocyanate.

* * * * *

UNITED STATES PATENT AND TRADEMARK OFFICE
CERTIFICATE OF CORRECTION

PATENT NO. : 4,211,847
DATED : July 8, 1980
INVENTOR(S) : Clifton L. Kehr, Louis L. Wood and James L. Guthrie It is certified that error appears in the above-identified patent and that said Letters Patent are hereby corrected as shown below:

In the Claims:

In Claim 4, column 12, line 44; delete "1-8" and insert therefor --1-18--.

*Signed and Sealed this*

*Seventh* Day of *October 1980*

[SEAL]

Attest:

Attesting Officer

SIDNEY A. DIAMOND

*Commissioner of Patents and Trademarks*